US012623424B2

(12) United States Patent　　(10) Patent No.:　US 12,623,424 B2
Chaurasia et al.　　(45) Date of Patent:　May 12, 2026

(54) METHOD FOR ADHERING CURED RUBBER COMPONENTS

(71) Applicant: Bridgestone Americas Tire Operations, LLC, Nashville, TN (US)

(72) Inventors: Vishal K. Chaurasia, Kent, OH (US); Yenni Marcela Castano Gil, Northfield, OH (US); Kung-Ching Liao, Akron, OH (US); Kentaro Kayashima, Copley, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 18/147,074

(22) Filed: Dec. 28, 2022

(65) Prior Publication Data

US 2023/0202129 A1　　Jun. 29, 2023

Related U.S. Application Data

(60) Provisional application No. 63/294,629, filed on Dec. 29, 2021, provisional application No. 63/294,641, filed on Dec. 29, 2021.

(51) Int. Cl.
　　*B29D 30/56*　　　(2006.01)
　　*C08G 18/10*　　　(2006.01)
　　(Continued)

(52) U.S. Cl.
　　CPC ............. *B29D 30/56* (2013.01); *C08G 18/10* (2013.01); *C08G 18/307* (2013.01); *C08J 5/124* (2013.01);
　　(Continued)

(58) Field of Classification Search
　　CPC .... B29D 30/56; B29D 2030/544; C08J 7/126; C09J 175/04
　　See application file for complete search history.

(56) References Cited

U.S. PATENT DOCUMENTS

| 3,198,680 | A | 8/1965 | Iknayan |
| 3,769,121 | A | 10/1973 | Martin |

(Continued)

FOREIGN PATENT DOCUMENTS

| AU | 2002328943 A1 | 2/2003 |
| CN | 1460591 A | 12/2003 |

(Continued)

OTHER PUBLICATIONS

Machine translation for Japan 50-007879 (Year: 2025).*

(Continued)

*Primary Examiner* — Steven D Maki
(74) *Attorney, Agent, or Firm* — Meredith E. Hooker; Arthur M. Reginelli

(57)　　ABSTRACT

A method for preparing a retreaded tire, the method comprising (a) providing a tire casing; (b) providing a pre-cured tire tread; (c) applying a primer composition to the tire casing, the pre-cured tread, or both the tire casing and the pre-cured tread therefore form at least one primer layer, where the primer composition includes a halogenating agent and a solvent; (d) applying a urethane-based adhesive composition to at least one of the tire casing, an adhesive layer, the pre-cured tread, or the at least one primer layer; (e) mating the pre-cured tread to the tire casing to thereby sandwich the adhesive layer between the pre-cured tread and the tire casing and form a pre-cured composite: and (f) allowing the adhesive layer of the pre-cured composite to cure and thereby form a retreaded tire.

13 Claims, 3 Drawing Sheets

(51) Int. Cl.

| | | |
|---|---|---|
| *C08G 18/30* | (2006.01) | |
| *C08J 5/12* | (2006.01) | |
| *C08J 7/12* | (2006.01) | |
| *C09J 175/04* | (2006.01) | |
| *B29D 30/54* | (2006.01) | |

(52) U.S. Cl.

CPC .............. *C08J 7/126* (2013.01); *C09J 175/04* (2013.01); *B29D 2030/544* (2013.01); *C08J 2307/00* (2013.01); *C08J 2309/06* (2013.01); *C09J 2407/006* (2013.01); *C09J 2409/006* (2013.01)

(56) References Cited

U.S. PATENT DOCUMENTS

| | | | |
|---|---|---|---|
| 3,840,506 | A | 10/1974 | Collette et al. |
| 3,931,106 | A | 1/1976 | Crosby et al. |
| 4,175,991 | A | 11/1979 | Harrelson, Jr. |
| 4,269,644 | A | 5/1981 | Goldstein |
| 4,434,832 | A | 3/1984 | Koch et al. |
| 4,435,456 | A | 3/1984 | Hausch |
| 4,618,519 | A | 10/1986 | Koch et al. |
| 4,634,488 | A | 1/1987 | Tournier |
| 5,104,476 | A | 4/1992 | Yamada et al. |
| 5,183,877 | A | 2/1993 | Swanson |
| 5,807,918 | A | 9/1998 | Carter |
| 5,951,797 | A | 9/1999 | Xia et al. |
| 6,328,840 | B1 | 12/2001 | Takano et al. |
| 6,355,826 | B1 | 3/2002 | Parker |
| 6,455,165 | B1 | 9/2002 | Knaub et al. |
| 6,624,283 | B2 | 9/2003 | Viegas et al. |
| 6,668,884 | B2 | 12/2003 | Koch et al. |
| 6,808,579 | B1 | 10/2004 | Pulford et al. |
| 7,025,851 | B2 | 4/2006 | Caster et al. |
| 7,252,728 | B2 | 8/2007 | Weydert et al. |
| 7,294,678 | B2 | 11/2007 | McGlothlin et al. |
| 7,332,047 | B2 | 2/2008 | Majumdar et al. |
| 7,399,805 | B2 | 7/2008 | Mousty et al. |
| 8,367,165 | B2 | 2/2013 | Basile et al. |
| 8,980,433 | B2 | 3/2015 | Laubry |
| 9,868,836 | B2 | 1/2018 | Korwin-Edson et al. |
| 2002/0018860 | A1* | 2/2002 | Filippou .................. B05D 3/08 427/407.1 |
| 2003/0229153 | A1 | 12/2003 | Stollmaier et al. |
| 2004/0192839 | A1 | 9/2004 | Mousty et al. |
| 2006/0118223 | A1 | 6/2006 | Maeda |
| 2006/0251908 | A1* | 11/2006 | Fukasawa ............ C09D 183/14 106/287.11 |
| 2012/0196976 | A1 | 8/2012 | Araujo Da Silva et al. |
| 2014/0202619 | A1 | 7/2014 | Sandstrom |
| 2016/0264753 | A1 | 9/2016 | Salit et al. |
| 2016/0311186 | A1 | 10/2016 | Bender |
| 2018/0244007 | A1 | 8/2018 | Barned et al. |
| 2024/0010820 | A1* | 1/2024 | Kuwabara ............ C08F 136/06 |

FOREIGN PATENT DOCUMENTS

| | | | | | |
|---|---|---|---|---|---|
| CN | 100460192 | C | 2/2009 | | |
| CN | 100503216 | C | 6/2009 | | |
| CN | 101781532 | B | 7/2012 | | |
| CN | 101791873 | B | 8/2012 | | |
| CN | 102358054 | B | 6/2013 | | |
| CN | 104044291 | A | 9/2014 | | |
| CN | 103881160 | B | 9/2016 | | |
| CN | 106239955 | A | 12/2016 | | |
| CN | 107839268 | A | 3/2018 | | |
| EP | 316666 | A | * 5/1989 | ............ | B29D 30/56 |
| EP | 0316666 | A1 | 5/1989 | | |
| EP | 0285647 | B1 | 1/1994 | | |
| EP | 0715948 | A1 | 6/1996 | | |
| EP | 0941264 | B1 | 7/2001 | | |
| EP | 1320566 | B1 | 12/2005 | | |
| EP | 2452833 | B1 | 5/2014 | | |
| EP | 3539762 | A1 | 9/2019 | | |
| GB | 746375 | A | 3/1956 | | |
| GB | 1449533 | A | 9/1976 | | |
| GB | 2039232 | B | 10/1982 | | |
| GB | 2270888 | A | 3/1994 | | |
| IL | 69129 | | 10/1983 | | |
| IN | 2842DEL2015 | I1 | 12/2017 | | |
| JP | 50-007879 | A | * 1/1975 | | |
| JP | 63159039 | A | 7/1988 | | |
| JP | 01-160635 | A | * 6/1989 | ............ | B29D 30/56 |
| JP | 09239864 | A | 9/1997 | | |
| JP | 2001288434 | A | 10/2001 | | |
| JP | 2002144442 | A | 5/2002 | | |
| JP | 2005111780 | A | 4/2005 | | |
| JP | 2006281683 | A | 10/2006 | | |
| JP | 2015083341 | A | 4/2015 | | |
| KR | 2006-0088322 | A | * 8/2006 | | |
| KR | 10-2067433 | B1 | * 2/2020 | | |
| WO | 1997003034 | A2 | 1/1997 | | |
| WO | 1998023660 | A1 | 6/1998 | | |
| WO | 2002026858 | A1 | 4/2002 | | |
| WO | 2008125645 | A1 | 10/2008 | | |
| WO | 2015177104 | A1 | 11/2015 | | |
| WO | 2016196410 | A1 | 12/2016 | | |

OTHER PUBLICATIONS

Machine translation for Korea 2067433 (Year: 2025).*

Machine translation for Korea 2006-0088322 (Year: 2025).*

Partial machine translation for Korea 2006-0088322 (Year: 2025).*

Strakšys, Antanas; Valsiūnas, Ignas; Stalnionis, Giedrius; Eicher-Lorka, Olegas; Kuodis, Zenonas; Bražinskienė, Dalia; Jukna, Artūras; and Asadauskas, Svajus, Influence of polyurethane adhesives on tensile and compressive properties of ground rubber composites, Chemija 2018, vol. 29 Issue 2, p. 145-156. 12p.

Bender D L, The development of a one-part heat curable urethane precure retread adhesive, The Free Library > Date > Apr. 1, 1997 > Rubber World.

* cited by examiner

10

METHOD FOR ADHERING CURED RUBBER COMPONENTS

This application claims the benefit of U.S. Provisional Application Ser. Nos. 63/294,629 and 63/294,641 filed on Dec. 29, 2021, which are incorporated herein by reference.

FIELD OF THE INVENTION

Embodiments of the invention are directed toward methods for retreading tires by employing a polyurethane adhesive to bond a cured tread element to a tire casing. Other embodiments of the invention relate to a rubber treatment composition and method of using the composition to facilitate adhering cured rubber components. In particular embodiments, the invention includes a method retreading a tire by using the rubber treatment composition in combination with a urethane adhesive.

BACKGROUND OF THE INVENTION

The bonding of vulcanized rubber components to vulcanized rubber substrates is technologically important. For example, in tire retreading processes, pre-cured tire treads are adhered to a tire casing, which is often prepared by removing a worn tread from a used tire. The pre-cured or vulcanized replacement tread is adhesively attached to a crown portion of the tire casing, which may also be referred to as a base tire.

Many commercially useful retreading processes employ a cushion gum to adhesively attach or bond the pre-cured tread to the tire casing. The cushion gum includes green or uncured rubber and a rubber curing agent. Upon formation of the composite (i.e. placement of the tread onto the tire casing with the cushion sandwiched there between), the composite is subjected to heat and pressure to thereby vulcanize the cushion gum and adhere the tread to the casing.

Retreading processes have been proposed that adhesively mate vulcanized tread to tire casing at ambient or relatively low temperatures. For example, European Patent Application No. 0 316 666 teaches a retreading process that includes the use of an amine-curable polymer or pre-polymer to adhere a pre-cured tire tread to a tire casing. Prior to applying adhesive composition to the tread or tire casing, a treating agent can be applied to the cured rubber in order to activate the cured rubber surface and allow the amine-curable polymer to bond therewith. The treating agent is a halogen-containing oxidant, such as trichloro-S-triazinetrione, that is applied to the cured rubber as a liquid or solution dissolved in an inert solvent such as butyl acetate.

While retreading processes that employ ambient or relatively low-temperature cure systems are environmentally beneficial, the current ambient or low-temperature technologies have several shortcomings.

SUMMARY OF THE INVENTION

One or more embodiments of the present invention provide a method for preparing a retreaded tire, the method comprising (a) providing a tire casing; (b) providing a pre-cured tire tread; (c) applying a primer composition to the tire casing, the pre-cured tread, or both the tire casing and the pre-cured tread therefore form at least one primer layer, where the primer composition includes a halogenating agent and a solvent; (d) applying a urethane-based adhesive composition to at least one of the tire casing, an adhesive layer, the pre-cured tread, or the at least one primer layer; (e) mating the pre-cured tread to the tire casing to thereby sandwich the adhesive layer between the pre-cured tread and the tire casing and form a pre-cured composite: and (f) allowing the adhesive layer of the pre-cured composite to cure and thereby form a retreaded tire.

DETAILED DESCRIPTION OF ILLUSTRATIVE EMBODIMENTS

Embodiments of the present invention are based, at least in part, upon the discovery of an ambient or low-temperature rubber adhering process that employs a urethane-based adhesive. In one or more embodiments, the invention includes a method whereby at least one cured rubber substrate is primed with a treating agent prior to being adhered with the urethane-based adhesive. And, it has been found that unexpected results are obtained when a threshold number of coating layers of the treating agent are applied to the substrate. In particular embodiments, the treating agent composition includes water and/or alcohol as a solvent. Given the limited solubility of the treating agents within water and/or alcohols, the ability to retread tires using these treating agents was unexpected. In one or more embodiments, the present invention is directed toward a tire retreading process where a pre-cured rubber tread is adhered to a base tire at low temperatures by treating at least one of the rubber surfaces with the treating agent composition and the adhering the rubber components with a urethane-based adhesive.

Overall Retreading Process

Figure 1:
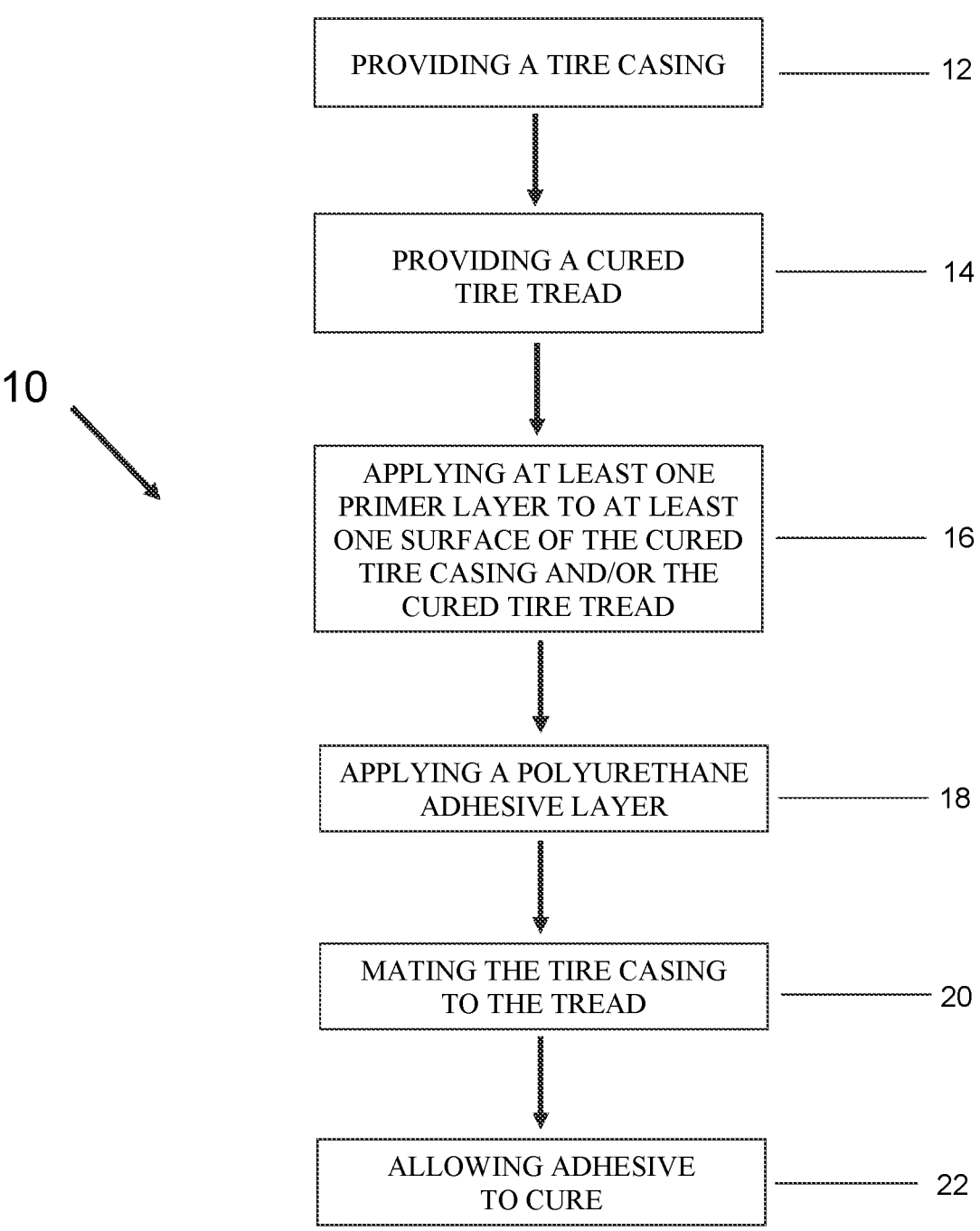
FIG. 1 is a flow chart showing the method of retreading a tire according to one or more embodiments of the invention.

The retreading process of one or more embodiments of the invention can be described with reference with FIG. 1, which shows a retreading process 10 including a step 12 of providing a tire casing having a mating surface for bonding to a pre-cured tread. A step 14 of providing a cured tire tread having a mating surface and road-contacting surface. A step 16 of treating at least one of the tire casing mating surface and the cured tire tread mating surface by applying a layer of a rubber treatment composition to thereby form at least one treatment layer. A step 18 of applying a layer of urethane-based adhesive to at least one of the primer layer (s), the tire tread mating surface, and the tire casing mating surface to thereby form at least one adhesive layer. A step 20 of mating the mating surface of the tire tread to the mating surface of the tire casing through with the at least one adhesive layer disposed there between. And a step 22 of allowing for the adhesive to cure and thereby adhere the pre-cured tread to the tire casing.

Providing a Tire Casing

In one or more embodiments, step 12 of providing a tire casing may include those sub-steps that are known in the art. For example, this may include collecting a tire that is in need of retreading and preparing the tire for retreading. The latter may include removing the existing tread, which can be accomplished by conventional buffing techniques. For example, the base tire or tire casing can be prepared by removing or grinding a worn tread and buffing the crown surface to a desired height. The base tire casing has a radial outward surface facing the radial inward surface of the tire tread to be attached. As the skilled person appreciates, a typical tire includes a carcass extending between a pair of axially-spaced beads. Abrasion strips partially encase the carcass at or near the respective beads. The tire further includes opposing sidewalls and a tread portion, which forms the outermost circumferential surface of the tire. A sub-tread is typically disposed below the tread, and an under-tread is typically disposed below the sub-tread. A belt package is disposed below the under-tread. The belt package, which may include a plurality of belts, is positioned above the carcass, which itself may include one or more body plies. An inner liner is typically disposed on the interior of the carcass relative to the tread portion. A skilled person will also appreciate that the tire may include various other components, such as, but not limited to, tread shoulders, cap plies, belt wedges, and belt shoulders. Most often the buffed surface left behind includes portions of the under-tread, but the buffed surface may include portions of the sub-tread. After buffing or otherwise removing the existing tread, the remaining substrate may be referred to as a tire casing or base tire or tire substrate.

In one or more embodiments, step 12 of providing a tire casing may include an inspection of the tire casing, which may include manual inspection such as a visual inspection and a tactile inspection. In one or more embodiments, inspection can be performed using the assistance of equipment that can perform non-destructive testing. This equipment may include, for example, X-ray.

In one or more embodiments, following the removal of the used tread layer, the tire casing may undergo repair. For example, the tire casing may undergo skiving and filling. Skiving is the removal of damaged material from a tire casing prior to making a repair. Often, a tire casing accumulates cuts, holes, nicks, or tears due to stones or other sharp objects that the tire comes in contact with during use. The injured or damaged area may be first ground smooth by an appropriate grinding tool and then filled with repair gum. It may be necessary to fill the injured areas to the level of the buffed surface to avoid air pockets between the buffed surface and the later applied tread layer.

In addition to skiving, which primarily addresses minor damage including non-penetrating injuries, the repair process may also include section repair wherein cables or other reinforcing elements of the tire casing are repaired. Also, repair may be made to penetrating injuries. This repair may occur by using various plugs and patches to repair punctures in the tire casing.

In one or more embodiments, the tire casing is allowed to equilibrate at ambient indoor temperature and humidity for a period of time (e.g. from about 10 to 15 hours) before undergoing subsequent steps in the process. In one or more embodiments, visible surface moisture on the tire casing is removed, and holes or other damage to the tire casing are repaired.

In one or more embodiments, the tire casing may include natural and synthetic rubbers, which may also be referred to as elastomers. For example, the synthetic elastomers may include diene-based rubbers such as butadiene rubber, styrene-butadiene copolymer rubber, isoprene rubber, butyl rubber, halogenated butyl rubber, acrylonitrile-butadiene rubber, chloroprene rubber, styrene-isoprene-butadiene copolymer rubber, and isoprene-butadiene copolymer rubber. Other useful rubbers include ethylene-propylene-diene copolymer rubber, styrene-isoprene copolymer rubber, ethylene-propylene copolymer rubber, acrylic rubber, epichlorohydrin rubber, polysulfide rubber, silicone rubber, fluororubber, urethane rubber, and combinations thereof.

In one or more embodiments, the rubber component of the tire casing is a diene-based rubber. In these or other embodiments, the rubber component of the tire casing includes synthetic polyisoprene or natural rubber. In these or other embodiments, the rubber component of the tire casing contains at least about 50 wt %; in other embodiments at least about 70 wt %; and in yet other embodiments at least about 80 wt % synthetic polyisoprene or natural rubber.

Providing a Pre-Cured Tread

In one or more embodiments, step 14 of providing a cured tire tread includes providing a pre-cured tire tread having first and second planar surfaces. For purposes of this description, the first planar surface includes a tread pattern and is the surface that contacts the road during use of the tire and may therefore be referred to as the road-contacting surface. The second planar surface is the bottom or radial inward facing surface that is mated to the tire casing and may therefore be referred to as the mating surface. In one or more embodiments, the mating surface of the tread is substantially devoid of nonstick surface agents such as, but not limited to, mold release agents, waxes, oils, etc. For example, in preparing the tire tread to be affixed to a base tire or tire casing, one or more surfaces may be buffed or roughened to remove nonstick surface agents.

In one or more embodiments, the tire treads for attachment to the base tire can be a pre-cured tire tread. For example, a green tire tread strip may be cured in a tread vulcanization mold, which is conventional in the art. As the skilled person appreciates, a tire tread vulcanization mold applies heat and pressure to cure the green tire tread strip. Mold temperatures typically reach 150 to 200° C., and mold pressures can reach 1200 to 6000 kPa. The pre-cured tire tread may then be removed from the tire tread vulcanization mold before it is cooled.

In one or more embodiments, the cured tire tread may be formed from rubber compounds including a variety of crosslinkable rubbers (also referred to as vulcanizable rubbers) such as, but not limited to, natural rubber, synthetic polyisoprene, polybutadiene, butadiene-isoprene copolymers, rubbery copolymers of butadiene and styrene, rubbery copolymers of butadiene and acrylonitrile, rubbery copolymers of isoprene and isobutylene, polychloroprene, ethylene-propylene rubbers, and the like.

In one or more embodiments, the rubber component of the pre-cured tire tread is a diene-based rubber. In these or other embodiments, the rubber compound of the pre-cured tire tread includes synthetic polyisoprene or natural rubber. In these or other embodiments, the pre-cured tire tread contains at least about 50 wt %, in other embodiments at least about 70 wt %, and in yet other embodiments at least about 80 wt % synthetic polyisoprene or natural rubber.

Applying Rubber Treatment Composition

As indicated above, at least one of the tire casing and the contacting surface of the pre-cured tread is treated with a rubber treatment composition by applying the composition to the surface thereof to form a treatment layer. For purposes of this specification, the rubber treatment composition may be referred to as a primer composition and the treatment layer may be referred to as a primer layer. In one or more embodiments, only the tire casing is treated. In other embodiments, only the contacting surface of the pre-cured tread is treated. In other embodiments, both the tire casing and the contacting surface of the pre-cured tread is treated. As the skilled person will appreciate, the tire casing is treated in the area that the tire casing will contact the pre-cured tread. Stated differently, the primer composition can be applied to the radial outward surface of the base tire, the radial inward facing surface of the tire tread, or to the surfaces of both the base tire and the tire tread.

Prior to applying the primer composition, the surface of the tire tread and/or the tire casing can be treated. For example, the surfaces can be cleaned with a solvent wipe such as a fabric (e.g. tissue paper) moistened in a solvent such as toluene or ethanol. The solvent is desirably chosen to remove any oils and waxes on the surface being primed. The cleaned surface may be provided time to dry (e.g. about 5 minutes) prior to applying the primer composition. Also, as discussed above, the surfaces of the tire tread and/or the tire casing can be mechanically abraded using, for example, a buffing process, which can provide a roughened surface and thereby provide mechanical adhesion.

In one or more embodiments, the rubber treatment composition may include one or more active compounds that halogenate or otherwise oxidize the surface being primed. In one or embodiments, the primer composition includes a chlorinating agent. Useful chlorinating agents include, but are not limited to, trichloroisocyanuric acid (TCI), 1,3-dichloro-5,5dimethylhydantoine (DHN), sodium dichloroisocyanurate (DCI), and combinations thereof.

In one or more embodiments, the active compounds of the primer composition (e.g. chlorinating agents) are dissolved, dispersed, or otherwise suspended in a solvent. In one or more embodiments, the solvent includes ethyl acetate or acetone. In these or other embodiments, the solvent may include an alcohol, an alkane, water, or combinations of two or more thereof. Useful alcohols include, but are not limited to, methanol, ethanol, and isopropanol. Useful alkanes include, but are not limited to, heptane and hexane. In particular embodiments, the solvent includes a mixture of water and an alcohol. In one or more embodiments, the solvent (and therefore the treating solution) is devoid or substantially devoid of a ketone, an aldehyde, and/or an ester.

In one or more embodiments, the primer composition may also include a stabilizing agent. As the skilled person appreciates, the stabilizing agents include those compounds that will assist in maintaining the solids portion of the composition in a desired state of being dissolved, suspended or otherwise dispersed in the solvent.

The concentration of the active compounds within the composition can be quantified based on the weight percent solids of the active compounds within the composition (i.e. weight of active agent relative to total weight of active agent and solvent). In one or more embodiments, the primer composition includes greater than 0.1 wt %, in other embodiments greater than 1 wt %, in other embodiments greater than 2 wt %, in other embodiments greater than 3 wt %, and in other embodiments greater than 4 wt % solids. In these or other embodiments, the primer composition includes less than 15 wt %, in other embodiments less than 12 wt %, in other embodiments less than 10 wt %, and in other embodiments less than 8 wt % solids. In one or more embodiments, the primer composition includes from about 0.1 to about 10 wt %, in other embodiments from about 1 to about 15 wt %, in other embodiments from about 2 to about 12 wt %, in other embodiments from about 3 to about 10 wt %, and in other embodiments from about 4 to about 8 wt % solids.

In one or more embodiments, the primer composition may be prepared by employing conventional mixing techniques. In one or more embodiments, the constituents of the primer composition can be combined and mixed under low-shear mixing. In other embodiments, the combined ingredients can be mixed using high-shear mixing. In these or other embodiments, the composition can be mixed using homogenization techniques.

In one or more embodiments, the primer composition is applied to the substrate within a threshold amount of time from being mixed or otherwise formed. For example, in one or more embodiments, the primer composition is applied to the substrate within 60 minutes, in other embodiments within 40 minutes, in other embodiments within 20 minutes, and in other embodiments within 10 minutes of being mixed or formed.

In one or more embodiments, the primer composition is applied to the substrate at ambient temperature. In other embodiments, the primer composition may be applied at temperatures below ambient temperature. In other embodiments, the primer composition may be applied to the substrate at temperatures above ambient temperature.

In one or more embodiments, the primer may be applied to the substrate (e.g. tread or base tire) using conventional coating techniques such as, for example, brushing and spraying. In one or more embodiments, two or more layers of the primer layer may be applied. For example, three or more layers, in other embodiments four or more layers, in other embodiments five or more layers, or in other embodiments six or more layers of the primer composition may be applied to the substrate. In one or more embodiments, from two to six layers are applied, in other embodiments from three to six layers, and in other embodiments from four to five layers are applied. In one or more embodiments, the primer composition may be allowed to dry (i.e. at least some of the solvent is evaporated) before the subsequent layer is applied. For example, a drying time of at least one minute, in other embodiments at least 3 minutes, or in other embodiments at least 5 minutes may be permitted before applying subsequent layers.

In one or more embodiments, the primer composition may be applied in a manner to form a layer thickness (i.e. the wet thickness of any given layer) of greater than 1 μm, in other embodiment greater than 10 μm, in other embodiments greater than 20 μm, and in other embodiments greater than 40 μm. In these or other embodiments, the primer composition may be applied in a manner to form a layer thickness (i.e. the wet thickness of any given layer) of less than 150 μm, in other embodiment less than 100 μm, in other embodiments less than 75 μm, and in other embodiments less than 50 μm. In one or more embodiments, the primer composition may be applied in a manner to form a layer thickness (i.e. the wet thickness of any given layer) of from about 1 to about 150 μm, in other embodiments from about 10 to about 100 μm, in other embodiments from about 20 to about 75 μm, and in other embodiments from about 40 to about 50 μm.

In one or more embodiments, prior to applying the urethane-based adhesive, the primed substrate may optionally be subjected to increased temperature to assist in volatilizing the solvent. For example, in one or more embodiments, the primed substrate (i.e. tire casing or tread) may be subjected to a temperature of greater than 30° C., in other embodiments greater than 50° C., in other embodiments greater than 75° C., and in other embodiments greater than 90° C.

In one or more embodiments, prior to applying the urethane-based adhesive, the primed substrate may optionally be provided adequate time to allow for the evaporation of a desired amount of the solvent within the primer composition, which may include substantially all of the solvent. The skilled person will appreciate that less time is required to evaporate the solvent if the primed substrate is subjected to higher temperatures. For example, in one or more embodiments, the primed substrate (i.e. tire casing or tread) may be provided a time of greater than 5 minutes, in other embodiments greater than 10 minutes, in other embodiments greater than 15 minutes, and in other embodiments greater than 20 minutes to allow sufficient evaporation of the solvent.

Applying Adhesive Composition

As indicated above, a urethane-based adhesive is applied to at least one of the tire casing, the contacting surface of the pre-cured tread, and the at least one primer layer to thereby form an adhesive layer. For purposes of this specification, the urethane-based adhesive may be referred to as an adhesive composition, a polyurethane adhesive composition, or simply as an adhesive. In one or more embodiments, the adhesive composition is only applied to an untreated tire casing. In other embodiments, the adhesive composition is only applied to a treated tire casing (i.e. to the primer layer on the tire casing). In other embodiments, the adhesive composition is only applied to an untreated tread. In other embodiments, the adhesive composition is only applied to a treated tire tread (i.e. to the primer layer on the pre-cured tread). In other embodiments, the adhesive composition is applied to a treated tire tread and a treated tire casing (i.e. to the primer layer on the pre-cured tread and the tire casing). As the skilled person will appreciate, the adhesive composition is applied to the tire casing in the area that the tire casing will contact the pre-cured tread. Stated differently, the adhesive composition can be applied to the radial outward surface of the base tire, the radial inward facing surface of the tire tread, or to the surfaces of both the base tire and the tire tread.

In one or more embodiments, the adhesive composition is applied to the substrate at ambient temperature. In other embodiments, the adhesive composition may be applied at temperatures below ambient temperature. In other embodiments, the adhesive composition may be applied to the substrate at temperatures above ambient temperature.

In one or more embodiments, the adhesive may be applied to the substrate (e.g. tread or base tire) using conventional coating techniques such as, for example, extruding, brushing and spraying.

In one or more embodiments, the adhesive composition may be applied in a manner to form a layer thickness of greater than 10 μm, in other embodiment greater than 20 μm, in other embodiments greater than 40 μm, and in other embodiments greater than 80 μm. In these or other embodiments, the adhesive composition may be applied in a manner to form a layer thickness (i.e. the thickness of any given layer) of less than 350 μm, in other embodiment less than 300 μm, in other embodiments less than 250 μm, and in other embodiments less than 200 μm. In one or more embodiments, the adhesive composition may be applied in a manner to form a layer thickness (i.e. the thickness of any given layer) of from about 10 to about 350 μm, in other embodiments from about 20 to about 300 μm, in other embodiments from about 40 to about 250 μm, and in other embodiments from about 80 to about 200 μm.

As indicated above, the adhesive composition is a urethane-based adhesive composition. In one or more embodiments, the adhesive composition is a two-part adhesive composition. In other embodiments, the adhesive composition is a one-part adhesive composition.

In one or more embodiments, the urethane-based adhesive may be formulated to have an open time (i.e. the time in which the adhesive has adequate tack and the ability to cure and adhere the rubber components being mated) of greater than 5 minutes, in other embodiments greater than 8 minutes, and in other embodiments greater than 10 minutes. In these or other embodiments, the urethane-based adhesive has an open time of less than 20 minutes, in other embodiments less than 15 minutes, and in other embodiments less than 12 minutes. In one or more embodiments, the urethane-based adhesive has an open time of from about 5 to about 20 minutes, in other embodiments from about 8 to about 18 minutes, and in other embodiments from about 10 to about 15 minutes.

In one or more embodiments, the urethane-based adhesive may be formulated to have a Tg (i.e. glass transition temperature upon curing) that is greater than 20° C., in other embodiments greater than 50° C., and in other embodiments greater than 80° C. In these or other embodiments, the urethane-based adhesive is formulated to have a Tg of less than 150° C., in other embodiments less than 100° C., and in other embodiments less than 50° C. In one or more embodiments, the urethane-based adhesive is formulated to have a Tg of from about −20 to about 150° C., in other embodiments from about 0 to about 100° C., and in other embodiments from about 20 to about 80° C.

Two-Part Urethane Adhesive

The skilled person appreciates that two-part urethane adhesive systems are provided by way of separate components that react when placed into contact (e.g. mixed). The first part, often referred to as the A-side, includes an isocyanate-containing compound. The second part, often referred to as the B-side, includes an isocyanate-reactive containing compound such as a polyol. The A-side or B-side may also include other constituents such as catalysts, plasticizers, fillers, and other ingredients often included in two-part urethane-based adhesives.

In one or more embodiments, the isocyanate-containing compounds may include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate and mixtures of these isomers; 1-isocyanato-3,3,5-trimethyl-5-isocyanato methyl cyclohexane; 2,4- and 2,6-hexahydrotolylene diisocyanate and mixtures of these isomers, hexahydro-1,3- and/or 1,4-phenylene diisocyanate, perhydro-2,5'- and/or 4,4'-diphenyl methane diiso-cyanate, 1,3- and 1,4-phenylene diisocyanate, 2,4- and 2,6-tolylene diisocyanate and mixtures of these isomers, diphenyl methane-2,4'- and/or 4,4'-diisocyanate, naphthylene-1,5-diisocyanate, triphenyl methane-4,4',4"-triisocyanate, polyphenyl polymethylene polyisocyanates, and perchlorinated aryl polyisocyanates. Select polyisocyanates can include an aromatic or cycloaliphatic polyisocyanate such as diphenylmethane-4,4'-diisocyanate, isophorone diisocyanate, and tetramethylxylene.

In one or more embodiments, the polyols include least about two, in embodiments no more than about four, isocyanate-reactive hydroxyl moieties. Useful polyols include, for example, polyether polyols, polyester polyols, poly (alkylene carbonate) polyols, hydroxyl-containing polythioethers, polymer polyols, and mixtures thereof.

Polyether polyols are known in the art and can include, for instance, polyoxyethylene, polyoxypropylene, polyoxybutylene, and polytetra-methylene ether diols and triols. The number-average molecular weight of the polyols for use in the polyurethane adhesive can be in the range of 1000 to 7000.

Polyester polyols are also known in the art and may be prepared by reacting a polycarboxylic acid or anhydride thereof with a polyhydric alcohol. Examples of polycarboxylic acids include succinic acid, adipic acid, suberic acid, azelaic acid, sebacic acid, phthalic acid, isophthalic acid, maleic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, maleic acid anhydride, glutaric acid anhydride, fumaric acid, and mixtures thereof. Examples of polyhydric alcohols useful in preparing polyester polyols include ethylene glycols, propane diols, butane diols, 1,6-hexanediol, 1,8-octanediol, neopentylglycol, glycerol, trimethylol propane, pentaerythritol, quinitol, mannitol, sorbitol, methyl glycoside, diethylene glycol, triethylene glycol, tetraethylene glycol, polyethylene glycols, polypropylene glycols, and mixtures thereof.

In one or more embodiments, the polyol(s) have an average functionality of at least 1.5, in other embodiments at least 1.8, and in other embodiments at least 2.0. In these or other embodiments, the polyol(s) have an average functionality of less than 4.0, in other embodiments less than 3.5, and in other embodiments less than 3.0. In other embodiments, the equivalent weight of the polyol(s) is greater than 200, in other embodiments greater than 500, and in other embodiments greater than 1,000. In these or other embodiments, the equivalent weight of the polyol(s) is less than, in other embodiments less than 3,500, in other embodiments less than 3,000, and in other embodiments less than 2,500.

In one or more embodiments, the polyol is a mixture of one or more diols and one or more triols. The one or more polyols may include polyether polyols, for example, polyoxyalkylene oxide polyols and ethylene oxide-capped polypropylene oxide-based polyols.

Polyurethane adhesives contemplated by the present invention can be made from prepolymers of pre-reacted polyols and polyisocyanates. Polyisocyanates for use in preparing the prepolymer include any aliphatic, cycloaliphatic, arylaliphatic, heterocyclic or aromatic polyisocyanate, or mixture thereof, for example, having an average isocyanate functionality of 2 to 4 and an equivalent weight of 80 to 300.

In one or more embodiments, the isocyanate-reactive compound useful as a curing agent is a polyol, water, a latent crosslinking material containing at least one oxazolidine moiety or a mixture thereof. Crosslinkers can include bisoxazolidines, the reaction product of a diisocyanate with a hydroxy alkyl-substituted oxazolidone such as an N-hydroxyethyl oxazolidone. Curing agents can also include diethylene glycol, butane diol, a bisoxazolidine, or mixtures thereof.

In one or more embodiments, useful catalysts include, but are not limited to, the stannous salts of carboxylic acids, such as stannous octoate, stannous oleate, stannous acetate, and stannous laureate; dialkyltin dicarboxylates, such as dibutyltin dilaureate and dibutyltin diacetate; tertiary amines and tin mercaptides. The catalyst can be added in amount of from about 0.005 and about 5 percent by weight of the mixture catalyzed. A plasticizer may be added after the exotherm recedes and the temperature drops to dilute reactants and thereby quench the reaction. The reaction may proceed until the free isocyanate-reactive moieties are reacted with isocyanate moieties.

In one or more embodiments, useful fillers include, but are not limited to, carbon black, titanium dioxide, calcium carbonate, surface treated silicas, titanium oxide, fumed silica, talc, and clays. Useful clays can include kaolin, surface treated kaolin, calcined kaolin, aluminum silicates and surface treated anhydrous aluminum silicates. The clays can be used in any form which facilitates formulation of a pumpable adhesive, such as pulverized powder, spray dried beads or finely ground particles.

The polyurethane adhesive can have an increased viscosity to promote easy flowability and application and fill any gaps or roughened surfaces at low pressures. In one or more embodiments, the polyurethane adhesive can have a viscosity in the range of 1500 to 4500 cPs or 2000 to 4000 cPs.

The polyols are present in an amount sufficient to react with most of the isocyanate groups of the isocyanates leaving enough isocyanate groups to correspond with the desired free isocyanate content of the prepolymer.

One-Part Urethane Adhesive

As indicated above, the adhesive composition may include a one-part urethane-based adhesive composition, which may also be referred to as a polyurethane adhesive composition, an adhesive composition, or simply an adhesive. The skilled person understands that one-part polyurethane adhesives include those polymeric compositions that include a polyurethane prepolymer including isocyanate groups, which crosslink in the presence of atmospheric moisture. Accordingly, the one-part polyurethane adhesives may also be referred to as moisture-curable polyurethanes.

The polyurethane prepolymers may be formed by employing conventional techniques. Generally, isocyanate compounds are reacted with polyols as outlined above for the two-part polyurethane adhesives. The reactants include excess isocyanate groups to provide the prepolymer with reactive isocyanate groups (i.e. moisture-reactive groups). In one or more embodiments, the prepolymer reaction is carried out under anhydrous conditions with an inert atmosphere such as a nitrogen blanket, which prevents crosslinking of the isocyanate groups by atmospheric moisture.

In addition to the polyurethane prepolymer, the one-part polyurethane adhesives may be additionally formulated with fillers and additives known in the art for use in adhesive compositions. The skilled person understands that the addition of these materials can modify the physical properties such as viscosity.

The polyurethane adhesives contemplated by the present invention may be formulated by blending the components, prepolymer and additives, together using means well known in the art. Generally, the components are blended in a suitable mixer in an inert atmosphere in the absence of oxygen and atmospheric moisture to prevent premature reaction. Once the polyurethane adhesive is formulated, it can be used in the retreading process or packaged in a suitable container such that is protected from atmospheric moisture and oxygen, which can result in premature crosslinking of the polyurethane prepolymer-containing isocyanate groups.

Useful one-part polyurethane adhesives are commercially available. For example, useful one-part adhesives can be obtained under the tradename BetaFuse (DuPont), 7100 (Lord), and DP604 (3M).

In one or more embodiments, the one-part polyurethane adhesive is formulated to have a Brookfield viscosity (RVT #4 Spindle; 20 rpm; 25° C.) of greater than 1 cPs, in other embodiments greater than 5 cPs, in other embodiments greater than 10 cPs, in other embodiments greater than 20 cPs, in other embodiments greater than 50 cPs, and in other embodiments greater than 100 cPs. In these or other embodiments, the polyurethane adhesive is formulated to have a Brookfield viscosity (RVT #4 Spindle; 20 rpm; 25° C.) of less than 5000 cPs, in other embodiments less than 2500 cPs, in other embodiments less than 1500 cPs, in other embodiments less than 1000 cPs, in other embodiments less than 500 cPs, and in other embodiments less than 250 cPs. In one or more embodiments, the polyurethane adhesive is formulated to have a Brookfield viscosity (RVT #4 Spindle; 20 rpm; 25° C.) of from about 1 to about 5000 cPs, in other embodiments from about 5 to about 2500 cPs, in other embodiments from about 10 to about 1500 cPs, in other embodiments from about 20 to about 1000 cPs, in other embodiments from about 50 to about 500 cPs, and in other embodiments from about 100 to about 250 cPs.

Mating the Pre-Cured Tread to the Tire Casing

As indicated above, once the adhesive composition is applied in a manner as described above, then the pre-cured tread can be mated to the tire casing. This includes bringing the contact surface of the pre-cured tread into contact with the tire casing in a manner that sandwiches the adhesive layer there between. Techniques for applying a pre-cured tread to a tire casing are known in the art and generally include wrapping the pre-cured tire tread around the casing.

In one or more embodiments, the step of mating the pre-cured tread to the tire casing includes the assistance of a building machine, which guides the pre-cured tread onto the tire casing against the adhesive layer by guide rollers. According to these techniques, the tire casing is rotated on a building machine until a sufficient length of the pre-cured tread is unraveled from a cured rubber component roll to extend around the circumference of the tire casing. The pre-cured tread is then cut generally transversely to the circumferential direction, and the cut end is butted up against the leading edge of the pre-cured tread to form a splice. The pre-cured tread splice may be held together by a plurality of staples. Once the pre-cured tread is applied on the tire casing, pre-cured tire composite is formed.

Allowing the Adhesive to Cure

Once a pre-cured tire composite is formed, then sufficient time is provided to allow the adhesive layer to cure and form a retreaded tire.

In one or more embodiments, the pre-cured tire composite undergoes curing under ambient temperature. In one or more embodiments, curing the pre-cured tire (e.g. allowing the adhesive to cure) takes place at a temperature (i.e. the temperature of the environment surrounding the pre-cured composite) of less than 100° C., in other embodiments less than 80° C., in other embodiments less than 70° C., and in other embodiments less than 60° C. In these or other embodiments, curing takes place a temperature of from about 10 to about 100° C., in other embodiments from about 15 to about 80° C., in other embodiments from about 20 to about 70° C., and in other embodiments from about 30 to about 60° C.

In one or more embodiments, the pre-cured tire composite undergoes curing while the composite is housed within a rubberized curing envelope designed for the particular tire type and size being retreaded. The envelope can be sealed to the beads of the tire casing. The rubberized curing envelope can be subjected to pressure so as to ensure that the tread conforms to the compound outer curvature of the casing. In one or more embodiments, the pressure applied is less than 100 PSI relative to atmospheric, in other embodiments less than 50 PSI relative to atmospheric, and in yet other embodiments less than 25 PSI relative to atmospheric. In one or more embodiments, the pressure applied is about 70 PSI to about 100 PSI relative to atmospheric, in other embodiments from about 80 PSI to about 95 PSI relative to atmospheric, and in yet other embodiments from about 85 PSI to about 90 PSI relative to atmospheric. In other embodiments, curing takes place in the absence of any added pressure (i.e. at or near atmospheric pressure).

As suggested above, the pre-cured composite is provided adequate time to achieve full cure or substantially full cure of the adhesive layer. In one or more embodiments, the time provided is greater than 5 minutes, in other embodiments greater than 8 minutes, and in other embodiments greater than 10 minutes. In these or other embodiments, the time provided is less than 45 minutes, in other embodiments less than 20 minutes, and in other embodiments less than 15 minutes. In one or more embodiments, the time provided is from about 5 to about 60 minutes, in other embodiments from about 8 to about 30 minutes, and in other embodiments from about 10 to about 20 minutes.

In order to demonstrate the practice of the present invention, the following examples have been prepared and tested. The examples should not, however, be viewed as limiting the scope of the invention. The claims will serve to define the invention.

EXAMPLES

Rubber treatment solutions were prepared and tested in accordance with the present invention. As shown in Table 1, various treatment solutions were prepared by combining a chlorinating agent with a solvent. The chlorinating agents were selected from trichloroisocyanuric acid (TCI), 1,3-dichloro-5,5dimethylhydantoine (DHN), and sodium dichloroisocyanurate (DCI), and were included into each solution at about 3 wt %. A solution using methyl ethyl ketone (MEK) was tested as a comparative example.

Figure 2:
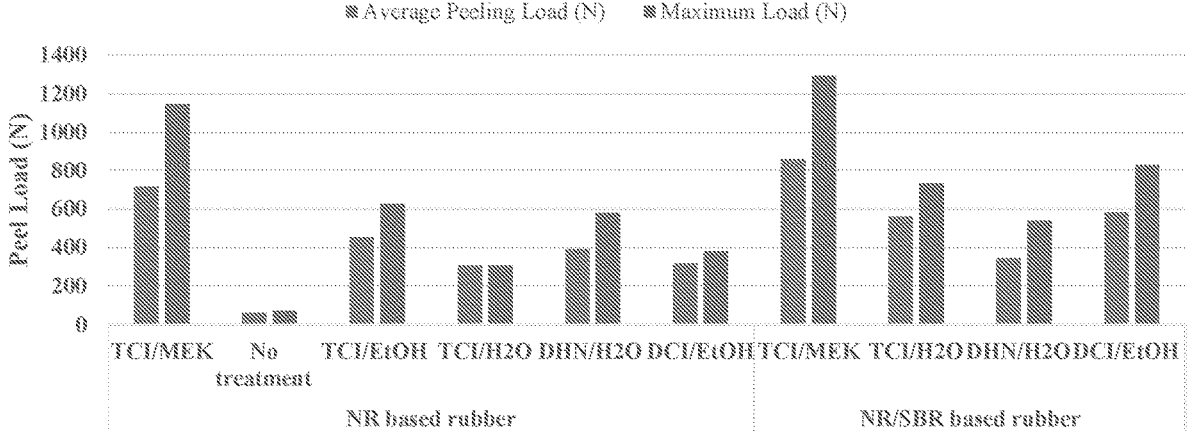
FIG. 2 is a graphical representation of experimental results obtained from testing done on samples prepared in accordance with the present invention.
Figure 3A:
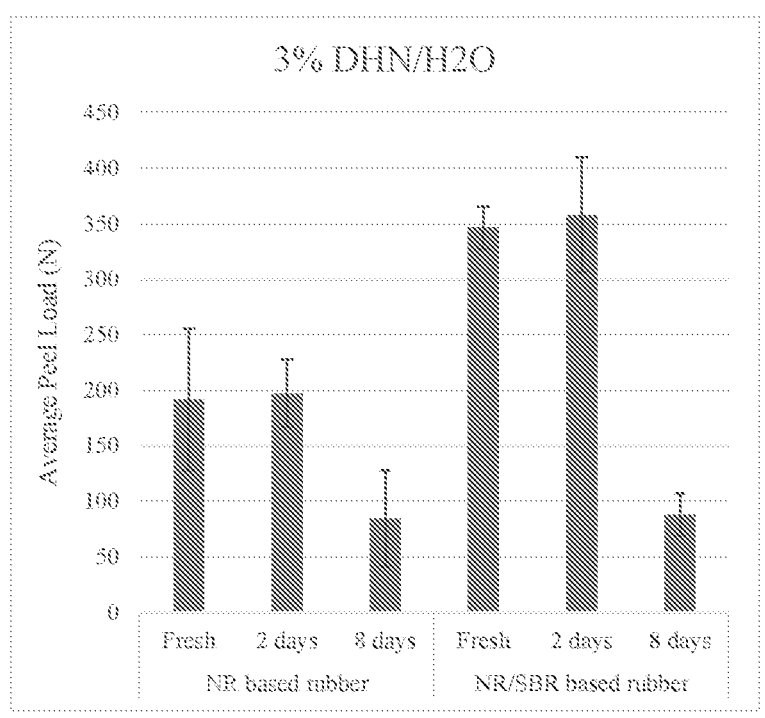
FIGS. 3a and 3b are graphical representations of experimental results obtained from testing done on samples prepared in accordance with the present invention
Figure 3B:
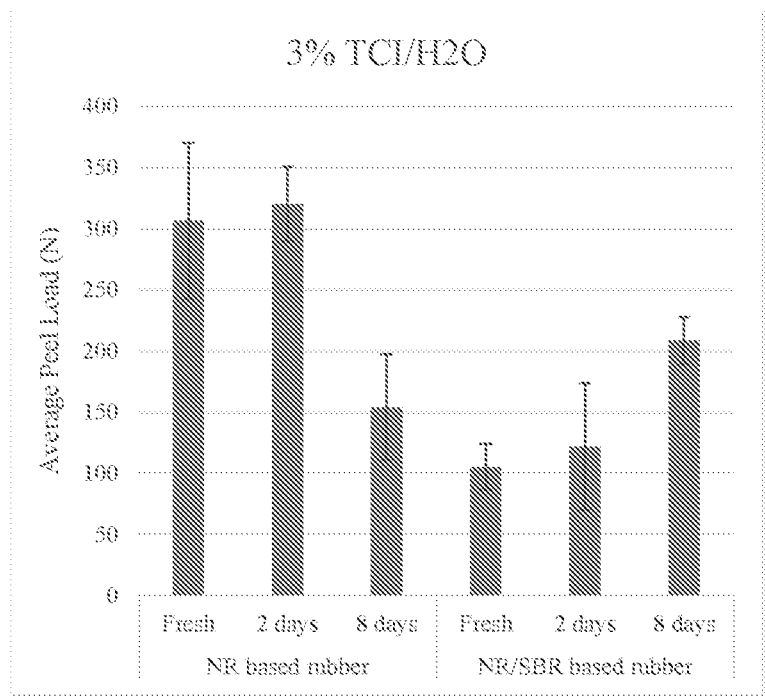

Experiments were performed by using two different rubber substrates, a natural rubber (NR) substrate and a blend of styrene butadiene rubber and natural rubber (SBR/NR) substrate. The contact surfaces of rubber substrates were treated by brushing with the various solutions at a frequency (i.e. number of layers) as disclosed in Table 1. In between each application and prior to application of the urethane-based adhesive, the wet coating later was allowed to dry for at least one hour at 50° C. As suggested above, once treated with the treatment solution, a urethane-based adhesive was employed to adhered to two rubber substrates at the treated surfaces to thereby form a test sample that was subsequently tested for peel adhesion and maximum load by employing standardized testing with an Instron machine. Table 1 provides the results of the testing tougher with the mode of failure, and the data is graphically represented in FIG. 2. Additionally, as shown in FIGS. 3a and 3b, the performance was compared when the rubber was treated with a primer prepared the same day as application, a primer prepared 2 days prior to application, and 8 days prior to application.

TABLE 1

| Rubber Substrate | Chlorinating Agent/ Solvent | Average Peeling Load (N) | Maximum Load (N) | Failure mode | Number of layers of surface treatment applied |
|---|---|---|---|---|---|
| NR based rubber | TCI/MEK | 714.85 | 1145.17 | Rubber tear | 2 |
| | No treatment | 63.285 | 72.615 | Interface | 0 |
| | TCI/EtOH | 454.72 | 627.32 | Rubber tear | 4 |

TABLE 1-continued

| Rubber Substrate | Chlorinating Agent/ Solvent | Average Peeling Load (N) | Maximum Load (N) | Failure mode | Number of layers of surface treatment applied |
|---|---|---|---|---|---|
| | TCI/H2O | 306.45 | 306.45 | Mix mode | 10 |
| | DHN/H2O | 391.365 | 579.125 | Rubber tear | 4 |
| | DCI/EtOH | 317.885 | 381.48 | Mix mode | 7 |
| NR/SBR based rubber | TCI/MEK | 858.98 | 1292.8 | Rubber tear | 2 |
| | TCI/H2O | 560.56 | 732.07 | Rubber tear | 10 |
| | DHN/H2O | 346.505 | 540.005 | — | 7 |
| | DCI/EtOH | 582.35 | 827.61 | Rubber tear | 7 |

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A method for preparing a retreaded tire, the method comprising:
   a. providing a tire casing, where the tire casing includes natural rubber and styrene butadiene rubber;
   b. providing a pre-cured tire tread where the pre-cured tire tread includes natural rubber and styrene butadiene rubber;
   c. preparing a primer composition, where the primer composition includes
      (i) trichloroisocyanuric acid and water, or
      (ii) sodium dichloroisocyanurate and ethanol;
   d. applying multiple layers of the primer composition to the tire casing, the pre-cured tread, or both the tire casing and the pre-cured tread to thereby form a multilayer primer coating, where said step of applying includes
      (i) applying at least ten layers where the primer composition includes trichloroisocyanuric acid and water, or
      (ii) applying at least seven layers where the primer composition includes sodium dichloroisocyanurate and ethanol;

e. applying a urethane-based adhesive composition to at least one of the tire casing, the pre-cured tread, and the multilayer primer coating to form an adhesive layer;
   f. mating the pre-cured tread to the tire casing to thereby sandwich the adhesive layer between the pre-cured tread and the tire casing and form a pre-cured composite; and
   g. allowing the adhesive layer of the pre-cured composite to cure and thereby form a retreaded tire, where said step of allowing the adhesive layer of the composite to cure takes place at a temperature of less than 80° C.

2. The method of claim 1, where the tire casing includes a radially outward facing surface, and where the primer composition is applied to the radially outward facing surface of the tire casing.

3. The method of claim 1, where the pre-cured tread includes a radially inward facing surface, and where the primer composition is applied to the radially inward facing surface of the tread.

4. The method of claim 1, where the adhesive composition is a two-part polyurethane adhesive.

5. The method of claim 1, where said step of allowing the adhesive layer to cure takes place at pressures of less than 100 PSI relative to atmospheric pressure.

6. The method of claim 1, where said step of allowing the adhesive layer to cure takes place without applying pressure on the urethane-based adhesive composition.

7. The method of claim 1, where the retreaded tire is a pneumatic tire.

8. The method of claim 1, where the primer composition has a solids content of less than 10 wt %.

9. The method of claim 8, where each layer of the multiple layers has a thickness of greater than 1 μm, where the thickness refers to the wet thickness of each layer.

10. The method of claim 1, where said urethane-based adhesive composition has a viscosity in the range of about 1,500 to about 4,500 cPs.

11. The method of claim 1, where said step of applying multiple layers of the primer composition includes allowing each layer of the multiple layers to dry for at least one minute before applying a subsequent layer.

12. The method of claim 1, where said applying takes place within two days of said preparing a primer composition.

13. The method of claim 1, where the tire casing includes a rubber component consisting of natural rubber and styrene butadiene rubber, and where the pre-cured tire tread includes a rubber component consisting of natural rubber and styrene butadiene rubber.

* * * * *